Nov. 4, 1930.    T. J. OSINGA    1,780,501
PLUMB PROTECTOR FOR ELEVATOR GUIDES
Filed Feb. 1, 1929
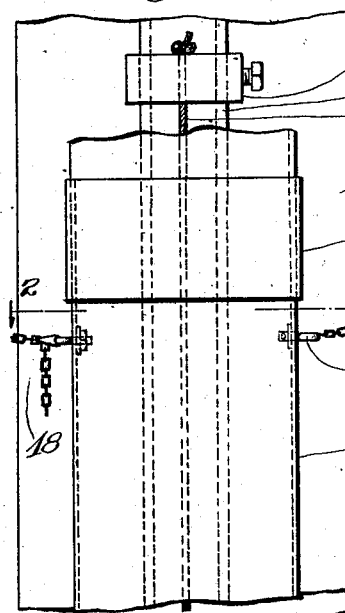
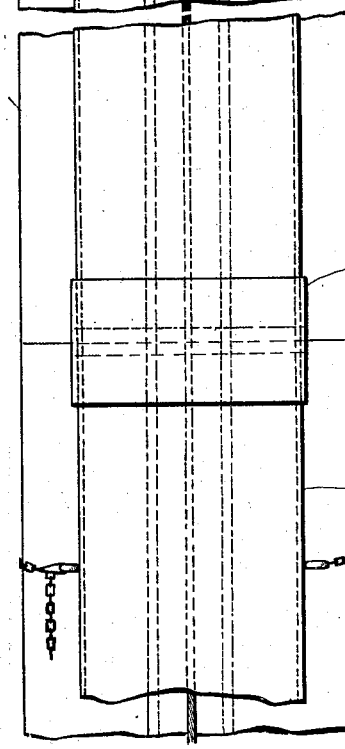
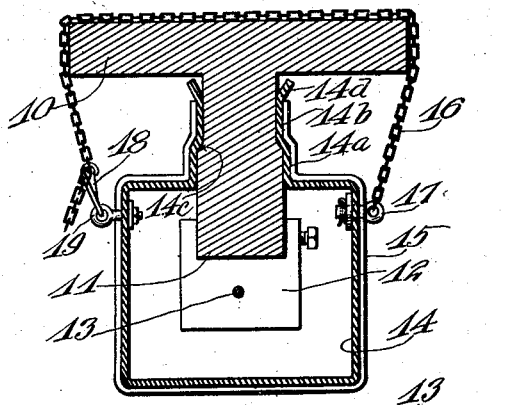
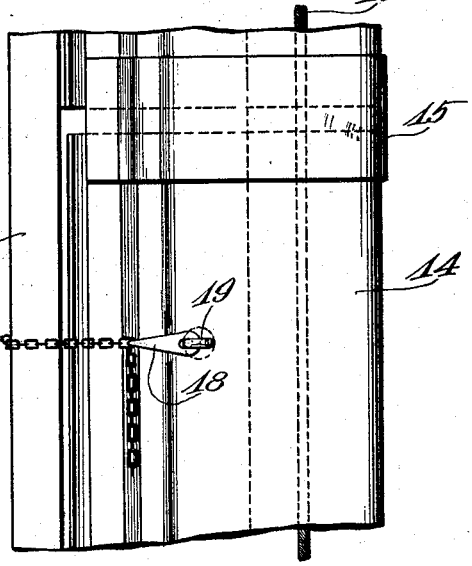
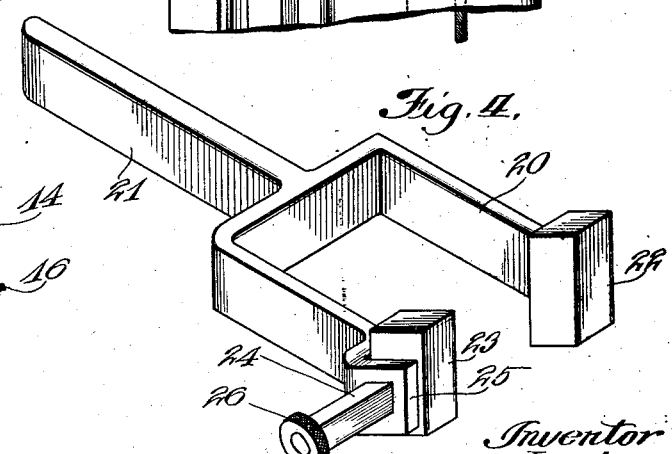
Inventor
Thomas J. Osinga
By Stevens and Batchelor
Attys.

Patented Nov. 4, 1930

1,780,501

UNITED STATES PATENT OFFICE

THOMAS J. OSINGA, OF CHICAGO, ILLINOIS

PLUMB PROTECTOR FOR ELEVATOR GUIDES

Application filed February 1, 1929. Serial No. 336,848.

My invention relates to plumb wires used in elevator shafts for the plumbing of the lateral guide rails while a building is under construction, and my main object is to provide a protective housing for the plumb wire, whereby the latter may be immune to air currents or wind pressure within the structure of the building.

In modern building construction, work on the elevators proceeds before the building walls or partitions are built up, and air currents and wind have to be contended with because of the open condition of the building. For the plumbing of the lateral guide rails of the elevator shafts, the wrapping of the entire shaft with tarpaulin is frequently resorted to in order to protect the internal plumb wire from the air and wind currents while the guide rails are adjusted in conformity with such wire. However, while the expedient of the tarpaulin may be efficient in its effect, it is expensive and bunglesome and also impedes the freedom of passage of the workmen or transfer of materials from the shaft to the exterior and vice versa. Usually, the site is left exposed and time allowed until atmospheric conditions are sufficiently tranquil to permit the plumbing tests and adjustments. As more or less time may be wasted by waits of this kind, I have considered that an immediate enclosure for the plumbing wire and peculiar to the situation of the guide rails would be a satisfactory means for accomplishing the object mentioned.

A further object of the invention is to apply the novel protective housing directly to the web of the guide rails and secure a support from the same by simple means.

A still further object of the invention is to construct the novel housing in sections, anyone of which may be readily removed for access to the plumbing wire.

Another object of the invention is to augment the line of housing sections by intermediate filler units, which render a complete enclosure by supplementing the housing sections.

A significant object of the invention is to provide a safety anchoring device for the housing sections, which provides a loosened housing section from accidentally dropping into the shaft.

A final, but nevertheless important object of the invention is to design a handy tool for the quick removal of any selected housing section.

With the above objects in view and any others that may suggest themselves from the specification and claims to follow, a better understanding of the invention may be gained by reference to the accompanying drawing, in which—

Figure 1 is an elevation of a typical guide rail, showing the novel protective housing applied;

Figure 2 is a plan section on the line 2—2 of Figure 1;

Fig. 3 is a side elevation from the left-hand side of Figure 2; and

Fig. 4 is a perspective view of the tool previously referred to.

Referring specifically to the drawing, 10 denotes the sections of the rail, these being in vertical superposed succession. The rail is generally considered as continuous and the only incidents therein are the joints of the sections and attaching brackets at each floor of the building, the latter not being shown. In plumbing a given rail, what is usually designated as a Johnson clip 12 is attached to the web 11 of the rail at the top thereof, the plumb wire 13 depending from the clip in front of the web as indicated in Figure 2. The sections of the rail are then adjusted in proper spacing and alinement with the plumb wire.

The novel housing is gnerally in the form of a square tube composed of a vertical series of sections 14 arranged opposite the rail web 11. One wall of the sections is divided as shown to receive the forepart of the web within it, and the divisions 14$^a$ are offset toward each other at 14$^b$ to conform to shoulders 14$^c$ on the sides of the web, the latter being reduced in thickness between these shoulders and the base. The divisions extend along the reduced portion of the web to a short distance from the base of the rail where they terminate flaredly as indicated at 100

14$^d$. The housing sections may thus be considered as having clip extensions engageable with the web 11 as indicated in Figure 2 for purposes of attachment and support.

In order that the housing sections may be laid out and applied with facility to a given rail, it is preferable that they be arranged spacedly in their sequence. However, in order that the spaces between the sections may not form a passage for air currents with detrimental effects upon the plumb wire 13 I see fit to cover the ends of the sections contiguous to each space with a band 15 similar in shape to the housing sections, but much shorter in length. The housing is now a complete enclosure for the plumb wire, yet takes up no appreciable room and the traffic surrounding the work in hand may proceed virtually the same as if the rail had not been enclosed.

The material of the housing and the bands is of sheet steel and has a sufficient inherent tension to firmly engage the web, yet permitting the disengagement thereof when the housing or bands are drawn open. No fastening devices are required to maintain the engagement of the housing with the web of the rail, but the safety feature is provided in case one loosens or removes a housing section and accidentally permits it to drop, as such a housing section may be at a high point in the building, and it may drop a long distance and endanger the safety of persons or objects at lower points in the elevator shaft.

The safety device referred to consists of a chain 16 secured at one side of each section to an eye or other permanent fastening device 17, and caught on the other side of the housing in a snapper 18, hung from an eye 19 secured to such side of the section. The chain is permitted to extend with a number of links beyond the snapper, so that it may be adjusted with reference to the latter. When a given section is applied as heretofore described, the chain is wrapped around the rail 10 as clearly shown in Figure 2 and caught in the snapper, this operation anchoring the section to the rail. In case a joint of rail sections or a bracket connection with the rail occurs opposite the site of the chain, the latter is of sufficient length to be raised or lowered, to avoid the enlargement, due to the extra links terminally provided as explained.

In the use of the novel housing, one or more sections are removed at each point where the rail is tested for plumbing purposes. Thus, if any air disturbance exists in the shaft, it will have practically no effect upon the steadiness of the plumb wire 13, as only a few feet of the wire will be exposed. My calculation is to construct the housing sections in four-foot lengths or thereabouts, the removal of one section at one point or another being both sufficient for attention to the plumbing requirement and safe as against ordinary air conditions. However, should plumbing be required on a windy day, some extra sections may be had which are in short lengths, such as one-foot or thereabouts, and the sections so arranged that but a limited space is open in the housing at the particular point where the testing and adjusting is done, leaving practically the entire course of the plumbing wire fully enclosed and protected against the swaying influences of the wind.

In applying any section to the web 11 of the rail it is evident that but direct pressure is required to fit the same since the flared ends 14$^d$ permit the easy progress of the clip extension over the web 11. However, for facility in removing any section, I have devised the tool of Figure 4. This tool is in the nature of a fork 20 with a rearwardly extending handle 21. One prong of the fork carries a block 22 while the other carries a similar block 23. The block 22 is fast on its prong, while the block 23 is carried by a stem 24 which passes through an offset 25 of the corresponding prong 20 in an outward direction to receive a finger knob 26. When the stem 24 has been drawn outwardly to seat the block 23 in the offset 25, the spacing of the blocks 22 and 23 is such as to straddle the housing section when the fork is advanced upon the same. However, when the prongs have reached a position opposite the clip portion of the housing, the block 23 may be advanced to close in toward the corresponding side of the said clip section and thus secure a retaining relation toward the housing. Now, by depressing the handle 21, the section may be wrenched loose from the rail web 11, eliminating what difficulty may be involved in that respect if the removal were done by hand.

It will be seen that the housing is primarily a thing of extreme compactness, since it extends only to the immediate surroundings of the plumb wire. In effect, the housing has a high protective efficiency, enabling the plumbing of the guide rails to be done at any time and without special attention to atmospheric conditions. At the same time, the housing is flexible of application and in use by reason of its sectional construction and freedom from accurate adjustment. In other words, the sections of the housing may be applied roughly and without the use of any skill, since the overlapping bands cover it completely irrespective of the spacing of the sections. The appliance requires no fastening device or labor in that connection, and is entirely safe by virtue of the chain anchoring expedient described. A suitable lid may be applied at the top of the housing to keep out rain, dust, etc. Further, the plumbing wire is protected against impact and kinking influences of objects and persons coming in contact with the same; thus, once the rail has been hung and the housing applied, the wire hangs freely and finds its position naturally. Needless to say, the housing on account of its simple and sectional form can be removed from the rails in one building and taken along to the next job in another building, making the use of the appliance very economical. Finally, it is evident that the housing and accessories thereof, on account of their extreme simplicity, are items involving but a nominal expense when the work for which they are designed is considered.

I claim:—

1. A protective enclosure for the plumb wire employed for alining the guide rails in an elevator shaft, comprising a tubular housing about the wire, and open in the side adjacent the rail, the latter forming a closure for the opening when the housing is assembled with the rail.

2. A protective enclosure for the plumb wire employed for alining the T-section guide rails in an elevator shaft, comprising a housing about the wire, and open in its side to receive the rail web, and extensions of the housing from the opening and engaging the web.

3. A protective enclosure for the plumb wire employed for alining the T-section guide rails in an elevator shaft, comprising a housing about the wire and open in its side to receive the rail web, the sides of the housing having an inherent convergent tendency, and extensions of the housing from the opening and engaging the web with pressure as a result of said tendency.

4. A protective enclosure for the plumb wire employed for alining the T-section guide rails in an elevator shaft wherein the web of the rail is reduced in thickness adjacent to the base, comprising a housing about the wire and open in its side to receive the rail web, and extensions of the housing from the opening, said extensions converging to seat in the reductions of the web and form clips to retain the housing to the rail.

5. A protective enclosure for the plumb wire employed for alining the T-section guide rails in an elevator shaft wherein the web of the rail is reduced in thickness adjacent to the base, comprising a housing about the wire and open in its side to receive the rail web, extensions of the housing from the opening, said extensions converging to seat in the reductions of the web and form clips to retain the housing to the rail, and terminal flared bends made from the extension to facilitate the engagement of the clips with the web.

6. A protective enclosure for the plumb wire employed for alining the T-section guide rails in an elevator shaft, comprising a housing of substantially rectangular cross-section about the wire, and open in one of its sides to receive the rail web, and bends from the sections of the open side extended upon the sides of the web to engage the latter.

7. A protective enclosure for the plumb wire employed for alining the T-section guide rails in an elevator shaft, comprising a housing of substantially rectangular cross-section about the wire, and open in one of its sides to receive the rail web, and bends from the sections of the open side extended outwardly from the housing upon the sides of the web to engage the latter.

In testimony whereof I affix my signature.

THOMAS J. OSINGA.